(12) United States Patent
Boeck et al.

(10) Patent No.: US 9,143,348 B2
(45) Date of Patent: Sep. 22, 2015

(54) METHOD FOR SCHEDULING BUS SYSTEM TRANSMISSIONS

(71) Applicant: Robert Bosch GmbH, Stuttgart (DE)

(72) Inventors: Heiko Boeck, Rutesheim (DE); Michael Helmle, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 305 days.

(21) Appl. No.: 13/668,699

(22) Filed: Nov. 5, 2012

(65) Prior Publication Data
US 2013/0117483 A1 May 9, 2013

(30) Foreign Application Priority Data
Nov. 4, 2011 (DE) .......................... 10 2011 085 764

(51) Int. Cl.
*G06F 13/00* (2006.01)
*H04L 12/403* (2006.01)
*G06F 13/364* (2006.01)
*H04L 12/40* (2006.01)

(52) U.S. Cl.
CPC ............ *H04L 12/403* (2013.01); *G06F 13/364* (2013.01); *H04L 12/4035* (2013.01); *H04L 2012/40234* (2013.01)

(58) Field of Classification Search
CPC ..................................................... G06F 9/4411
USPC .................................. 710/104–110, 306–310
See application file for complete search history.

(56) References Cited

U.S. PATENT DOCUMENTS

| | | | |
|---|---|---|---|
| 7,406,531 B2 * | 7/2008 | Fuehrer et al. ................. | 709/232 |
| 7,899,954 B2 * | 3/2011 | Kanazawa et al. .............. | 710/33 |
| 7,949,811 B2 * | 5/2011 | Fuehrer et al. ................. | 710/117 |
| 8,065,042 B2 * | 11/2011 | Flandre et al. .................... | 701/1 |
| 8,571,044 B2 * | 10/2013 | Ihle et al. ....................... | 370/401 |
| 8,654,580 B2 * | 2/2014 | Kang et al. ............... | 365/185.03 |
| 2005/0066062 A1 * | 3/2005 | Hartwich .......................... | 710/1 |
| 2007/0088883 A1 * | 4/2007 | Wakabayashi ................ | 710/110 |
| 2008/0177919 A1 * | 7/2008 | Miyazawa ..................... | 710/110 |
| 2014/0077768 A1 * | 3/2014 | Jung ............................. | 320/134 |

* cited by examiner

*Primary Examiner* — Raymond Phan
(74) *Attorney, Agent, or Firm* — Kenyon & Kenyon LLP

(57) ABSTRACT

A method for operating a bus system, which includes a master and k slaves as users, where a header of an interrogation frame, which includes k information fields, is transmitted by the master to the slaves; in each instance, an mth slave being assigned an mth information field; an information item regarding the amount of data that is to be sent by the mth slave to the master being written by the mth slave to the mth information field assigned to it; the interrogation frame being transmitted to the master; and a time schedule, by which the amount of data to be sent is taken into account, being prepared by the master for transmitting the data.

11 Claims, 4 Drawing Sheets

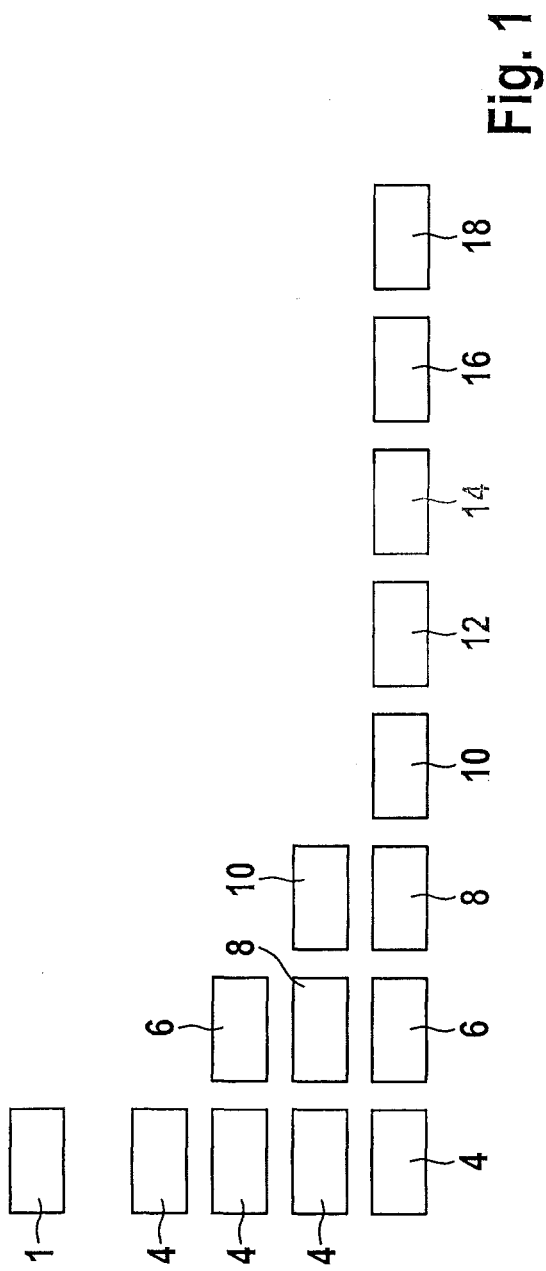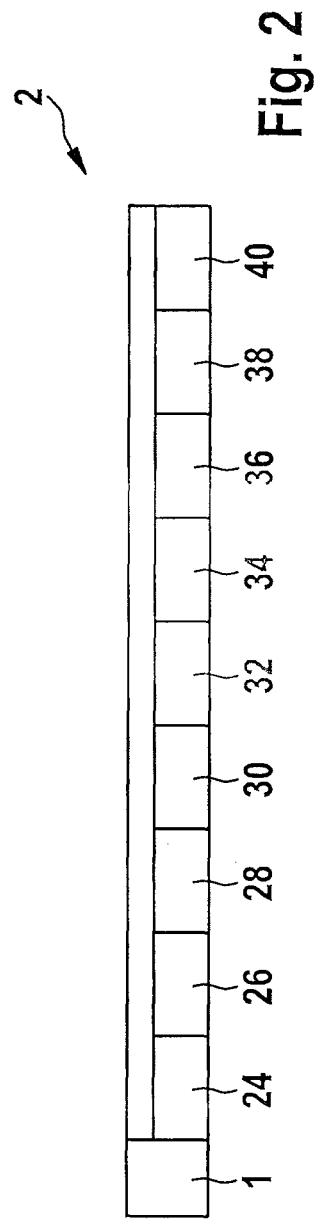

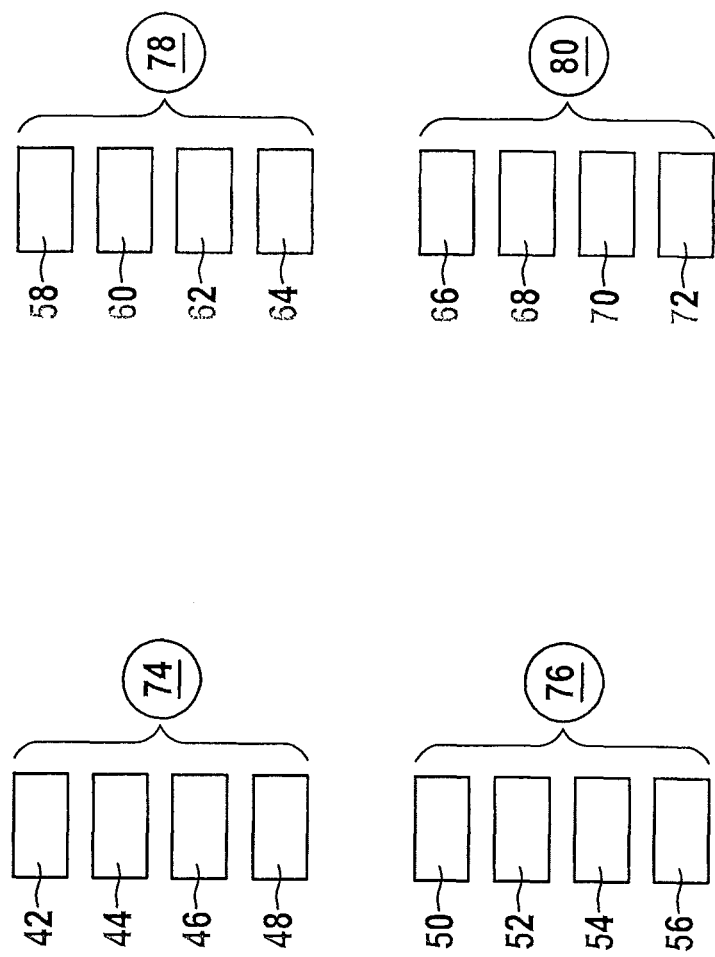

us 9,143,348 B2

METHOD FOR SCHEDULING BUS SYSTEM TRANSMISSIONS

CROSS REFERENCE

The present application claims the benefit under 35 U.S.C. §119 of German Patent Application No. DE 102011085764.8 filed on Nov. 4, 2011, which is expressly incorporated herein by reference in its entirety.

FIELD OF THE INVENTION

The present invention relates to a method for operating a bus system, as well as to a bus system.

BACKGROUND INFORMATION

A local interconnect network (LIN) is a specification for a serial communication system and, consequently, for a serial bus system, which is also called a LIN bus. This bus system may be used for achieving communication between sensors and/or actuators and a control unit as users of the bus system, e.g., in a motor vehicle.

Event-triggered frames (ETF) and sporadic frames (SF) are introduced by the LIN 2.0 standard for data that are transmitted between the users. Therefore, it is possible to influence a time schedule (schedule) for transmitting data, that is, the above-mentioned frames allow sporadic or event-driven data transmission, but the frames themselves are rigidly defined in the schedule.

In sporadic frames, a plurality of messages having static priority may be defined for a time slot. In such a time slot (slot), a message is only sent when data are present for a master as a user of the bus system, or when slave responses are demanded by the master. If neither is the case, then the bus system remains empty during this time. Thus, the bus system cannot be utilized to full capacity, using sporadic frames.

Using event-triggered frames, it may be taken into account that not all slaves, as users of the bus system, have data to send in every data transmission cycle. In this context, an event-triggered frame may be assigned a plurality of slaves, that is, a plurality of slaves may respond to a header of an event-triggered frame. If there is a collision between transmitted frames, then the slaves may detect this by reading back the data, and may interrupt the transmission process. The master then detects a receiving or timeout error. At a next time slot of this event-triggered frame, the master interrogates the slaves, using normal messages, or using separate identifiers. That is, for each slave that reacts to an event-triggered frame, in each instance, an unequivocal, normal identifier must also exist.

As of the LIN 2.1 standard, it is stipulated that after a collision, the master must change one time to another time schedule that is collision-free, and after it is finished, the master must switch back again to the original table of the time schedule. To this end, however, it is necessary that collision detection is implemented. In addition, in the event of a collision, considerable delays are created by the repeated and individual interrogation of the slaves. Thus, as a rule, event-triggered frames are only useful when only very few collisions are to be expected.

A control method for media access in a serial bus is described in German Patent Application No. DE 197 21 740 A1. This serial bus includes several users that communicate with one another via data messages. In order to allow individual users to access the bus at particular times, trigger messages are sent in a cyclical sequence by a first user taking the form of a master. In this context, each trigger message contains the beginning and the duration of the sending authorization for at least one user selected by the master. For the selected users, a timing interval for transmitting data messages is stipulated by the trigger message. Prior to the sending of a next trigger message, the slaves may request, from the master, sending authorizations for further data messages.

SUMMARY

In accordance with example embodiments of the present invention, idle times and/or blank bytes within a frame for data transmission on the bus system may be eliminated, the cycle time may be reduced, and the latency time may be reduced if, e.g., no slave has data to send as a user of the bus system. No collisions occur in the method. Consequently, the bus system may be utilized up to 100% capacity.

In order to achieve this, a master queries k slaves, using an interrogation frame common to all k slaves, as to if and how many data each slave is to send in a subsequent data transmission cycle. To this end, an example method is used in which several slaves share the one interrogation frame.

The interrogation frame includes k information fields. The master sends a header of this interrogation frame, whereupon each of the k slaves writes data to one of k information fields. Together with the check sum, which the last slave sends, the header and the information fields yield the complete and LIN-compliant interrogation frame on the bus system. After receiving the interrogation frame, the master reads the information fields sent by the slaves. After that, the master generates a time schedule, which is made available, and consequently, at least implicitly communicated, through at least one time slot (slot), generally, a sequence of time slots, which is/are assigned to at least one slave. In addition, at least one slave may be induced by the master to send data in a time slot for transmitting the data, using a data transmission frame, the time slot being assigned to the slave.

In this context, the master may additionally transmit, with the header, synchronization information for the slaves and/or for the data transmission cycle. Furthermore, a sequence, a size and/or a maximum amount of the data to be transmitted by the slaves may be set by writing the data into the information fields.

In one example embodiment of the present invention, each slave may write data to an information field of the interrogation frame, the information field including, e.g., one byte; the sequence of the information fields being determined by an identity (ID) of the slaves and/or their position in the bus system. The header of the interrogation frame is sent for carrying out an interrogation. According to the LIN standard, the interrogation frame may include eight information fields having a maximum length of 8 bytes, which means that a maximum of k=8 slaves may be interrogated as users of the bus system.

Using a particular value, e.g., "0," which may also be referred to as a blank value, in which case the slave inputs, and therefore, writes, this blank value into the information field of the interrogation frame assigned to it, the slave signals to the master that no new data are present for the next data transmission cycle, which is initiated and/or prepared by the interrogation frame.

If data to be sent are present in an mth slave, then a first part of the information field of the interrogation frame, which information field is assigned to the slave and includes, e.g., 5 bits of the one byte, may include a value for a first indication of the data to be transmitted in the data transmission cycle. In the second part of the information field, which is assigned to the slave and includes, e.g., 3 bits, the slave communicates the amount, e.g., the number of bytes, of data, which are to be transmitted in the next data transmission cycle.

After receiving and processing the interrogation frame, the master is now able to prepare, for the next data transmission cycle, a time schedule optimized according to the actual need, e.g., select it from several schedules already available. However, it is also possible for such a schedule to be generated by the master during operation and, in some instances, to be made note of for other, future data transmission cycles, by storing it.

The following information of the slaves is made available to the master by the received interrogation frame:
- the number of slaves that have data to send: from this, the master may deduce how many time slots are to be provided;
- a first indication of the data to be transmitted, e.g., with regard to their origin, relevance, importance and/or urgency: from this, the master may deduce the time sequence in which the slaves are assigned time slots of the schedule. The time sequence, according to which the slaves are assigned the time slots in the data transmission cycle, may be set as a function of the magnitude of a value for quantitatively grading the indication of the data to be sent. In this context, a first, selected slave, which has a first value as a data indication, is assigned a first time slot at a first time; an nth selected slave, which has an nth value as a data indication, is assigned an nth time slot at an nth time, etc.;
- the amount of data to be sent by a slave: from this, the master deduces which time interval should include a time slot, a length of the time interval being determined by the amount and/or a required storage space of the data to be transmitted by a slave in the data transmission frame.

The master provides different time schedules (schedules) in its configuration, e.g., in accordance with the number k of slaves present. In this context, each schedule is characterized by a number and sequence of time slots. The number of time slots corresponds to the number of slaves, which have data to send in the data transmission cycle. A length of a time interval of a time slot is adapted by the master to the specific amount of data, which is to be sent by the associated slave. In addition, a transmission time may be set for each time slot, using the time schedule. In this manner, a sequence of time slots assigned by the master is defined. The time sequence, in which the slaves send the data transmission frames, also follows from this. Furthermore, the time sequence, in which the master receives the data transmission frames again, is set by this. This relates to a time, at which the master receives the, at this point, mth data transmission frame from the mth slave.

An interrogation, in which a header of an interrogation frame is sent by the master to the slaves, may be carried out cyclically. Thus, during an interrogation, a header is sent cyclically, until at least one slave signals, by writing an information item to the information field assigned to it, that it has new data to transmit. Therefore, in practice, the slaves are interrogated, and thus, polled, at a cycle time, as long as no data are to be transmitted. If an error occurs during the transmission of the header, then this is re-sent and/or re-initiated by the master.

The example method in accordance with the present invention may then be used, for example, if a new data transmission cycle is intended to be started as rapidly as possible after a time period in which no data were sent. Using the method, it may be taken into account that data are not always or not constantly supplied by the slaves. By setting up a time slot for a data transmission frame, it may be taken into account that an amount of data of the slaves may vary in each data transmission cycle. Thus, a schedule, which includes time slots for a data transmission cycle, may be flexibly set for the slaves.

To supply the schedule, which is optimized with regard to need, to a bus system that is configured, e.g., as a LIN bus system, the master queries the slaves as to if and how many data they have to send. In this connection, all of the slaves of the LIN bus system are interrogated, using the common header of an interrogation frame that the slaves share. In this context, each of the slaves is assigned an interrogation-frame information field, which includes, e.g., one byte, and via which the slave indicates whether or not new data are being sent. Furthermore, the slave may also indicate how many bytes of data are to be transmitted. After the information fields are filled in, the interrogation frame is sent to the master. On the basis of this, it is possible to prepare a time schedule optimized for the actual need for data to be transmitted. Generally, a slave may explicitly indicate to the master, how large the amount and how high the importance of the data to be transmitted to it are.

In a time-controlled LIN bus system, the master determines when which slave may transmit its data, using dedicated time slots that are communicated to the slaves in accordance with the schedule. The schedule for a data transmission cycle may be dynamically adjusted during operation. Several schedules may be defined, between which the master may dynamically switch over at the running time.

Using the present invention, it may be taken into account, inter alia, that not all, but only particular slaves also have current data to send, and that an amount of data of a slave may vary from data transmission cycle to data transmission cycle. Consequently, a lot of idle time and blank bytes on the bus system may be prevented, which means that a payload data transmission rate may be optimized. In addition, high latency times may now be prevented.

Using the dynamic determination, which is provided in the scope of the present invention and relates to the time at which a slave sends its data within a data transmission cycle, it may be taken into account, e.g., that the slave, whose data were present first and are therefore the oldest, is also the slave, which sends its data first. Consequently, it may be prevented that the slave, which ascertained its data first, transmits them last in a data transmission cycle.

The bus system of the present invention is configured to execute all of the steps of the method set forth. In this context, individual steps of this method may also be implemented by individual components of the bus system. In addition, functions of the bus system or functions of individual components of the bus system may be implemented as steps of the method. Furthermore, it is possible to implement steps of the method as functions of at least one component of the bus system or of the entire bus system.

Additional advantages and embodiments of the present invention may be derived from the description below and the figures.

It will be appreciated that the features mentioned above and the features described below may be used not only in the combination given in each case, but also in other combinations or individually, without departing from the scope of the present invention.

BRIEF DESCRIPTION OF THE DRAWINGS

FIG. 1 shows a schematic representation of examples of schedules, which include sequences for time slots that are used in a first specific example embodiment of the method of the present invention.

FIG. 2 shows a schematic representation of an example of an interrogation frame.

FIG. 3 shows a schematic representation of further examples of time slots, which are assigned to different slaves in a second specific example embodiment of the method of the present invention.

DETAILED DESCRIPTION OF EXAMPLE EMBODIMENTS

Figure 4:
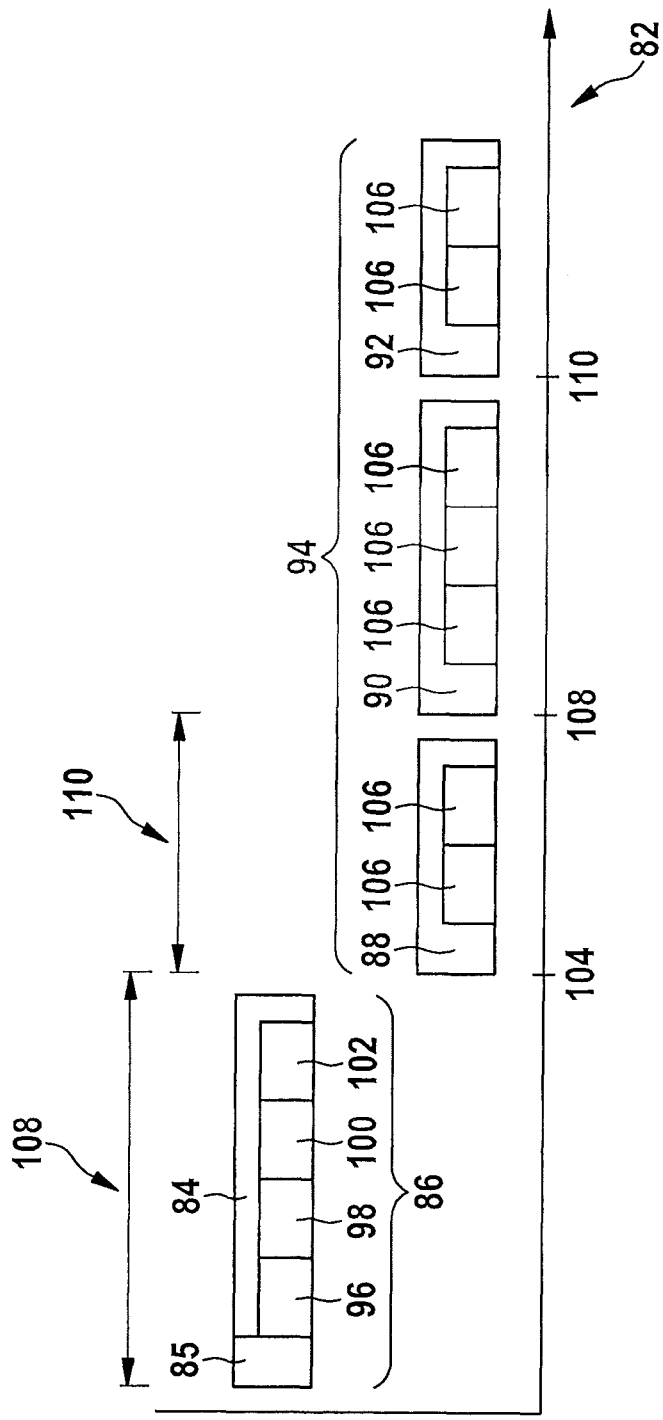
FIG. 4 shows a schematic representation of a diagram regarding a third specific example embodiment of the method of the present invention.

In FIG. 1, a header 1 of an interrogation frame 2 represented by the subsequent FIG. 2 is shown in a first line; the interrogation frame being sent by a master of a bus system to a total of k slaves of the bus system, where k=8, in order to carry out an interrogation. During the interrogation, only the header 1 shown here in FIG. 1 is transmitted.

If data are to be transmitted by only a first slave during a designated data transmission cycle, then, according to a first schedule, a first time slot 4 is provided by the master for the only one, e.g., first slave, as the second line from FIG. 1 shows.

In the third line, a second time slot 6 is also shown next to first time slot 4; the second time slot being in a schedule for a data transmission cycle, in which data are to be sent by two slaves. In this connection, second time slot 6 is assigned to a second slave of the bus system.

In this context, in a schedule of a data transmission cycle illustrated in the fourth line of FIG. 1, data are transmitted by three slaves. To this end, using the schedule, first time slot 4 is provided for the first slave, a third time slot 8 is provided for a third slave, and a fourth time slot 10 is provided for a fourth slave.

If, in specific embodiments of the method of the present invention, data are to be sent by all k slaves in a data transmission cycle, a schedule, which is represented by the fifth line of FIG. 1, provides a time slot 4, 6, 8, 10, 12, 14, 16, 18 for each of these slaves. In this context, first time slot 4 is assigned to the first slave, second time slot 6 is assigned to the second slave, a third time slot 8 is assigned to a third slave, a fourth time slot 10 is assigned to a fourth slave, a fifth time slot 12 is assigned to a fifth slave, a sixth time slot 14 is assigned to a sixth slave, a seventh time slot 16 is assigned to a seventh slave, and an eighth time slot 18 is assigned to an eighth slave.

The time slots 4, 6, 8, 10, 12, 14, 16, 18 shown in FIG. 1 have time intervals, a length of a time interval of a time slot 4, 6, 8, 10, 12, 14, 16, 18 being individually and flexibly adapted to the amount of data to be transmitted by a slave for each data transmission cycle. Thus, e.g., a time interval of first time slot 4 may be adapted to the amount of data, which are to be transmitted by the first slave, for each schedule set forth.

Furthermore, a sequence, in which the master assigns time slots 4, 6, 8, 10, 12, 14, 16, 18 to the slaves, is set by the schedules represented in FIG. 1. This yields, in turn, the sequence in which the slaves provide data transmission frames and fill them with the data, as well as the sequence, in which the slaves send the data transmission frames to the master, and in which order the master receives the data transmission frames from the slaves.

Possible details regarding a length of time intervals of time slots 4, 6, 8, 10, 12, 14, 16, 18, which is a function of the amount of data, and through which a length of data transmission frames for receiving data to be transmitted during a specific data transmission cycle is defined, are described in light of the following FIG. 3.

FIG. 2 shows a schematic representation of details regarding a structure of an interrogation frame 2, which includes the header 1 represented in FIG. 1. Apart from header 1, interrogation frame 2 has k empty information fields 24, 26, 28, 30, 32, 34, 36, 38, where k=8, as well as an additional check field 40. After the slaves fill information fields 24, 26, 28, 30, 32, 34, 36, 38 with information regarding data to be sent, interrogation frame 2 is sent to the master. In this context, a first information field 24 is assigned to a first slave, a second information field 26 is assigned to a second slave, a third information field 28 is assigned to a third slave, a fourth information field 30 is assigned to a fourth slave, a fifth information field 32 is assigned to a fifth slave, a sixth information field 34 is assigned to a sixth slave, a seventh information field 36 is assigned to a seventh slave, and an eighth information field 38 is assigned to an eighth slave of the bus system having, in this case, a total of eight slaves. In a cyclical redundancy check, a check sum designated for this is provided and/or calculated via the final check field 40 for entire interrogation frame 2.

In the implementation of the specific embodiment of the method according to the present invention, data are still not written to the information fields 24, 26, 28, 30, 32, 34, 36, 38 assigned to the slaves, when header 1 of interrogation frame 2 is transmitted by the master to the slaves in an interrogation cycle. The slaves receive header 1 in accordance with their sequence in the bus system. If at least one of the slaves, e.g., an mth slave, has data to send to the master in the following data transmission cycle, this mth slave writes at least one information item regarding the data to be sent, to the empty, mth information field 24, 26, 28, 30, 32, 34, 36, 38 assigned to it. In this context, each of these information fields 24, 26, 28, 30, 32, 34, 36, 38 is divided into two parts. In so doing, the mth slave may write information regarding an indication of the data to be sent, to the first part, which, in this case, includes 5 bits. The mth slave may write information regarding the amount of data to be sent by it, to a second part of the mth information field 24, 26, 28, 30, 32, 34, 36, 38 assigned to it; in this case, the second part of information field 24, 26, 28, 30, 32, 34, 36, 38 including 3 bits. If the mth slave does not have any data to send to the master in the next data transmission cycle, the mth slave writes a so-called blank value, which is to be suitably agreed upon and may have, e.g., a value of 0, to the mth information field 24, 26, 28, 30, 32, 34, 36, 38 assigned to it. According to this, it is provided that data of header 1, which may include, e.g., identities (IDs) of the slaves to which header 1 is addressed, be written by the master and read by the slaves. Data in information fields 24, 26, 28, 30, 32, 34, 36, 38 are written by the slaves. The check sum is written to check field 40 by a last slave of the bus system. Information fields 24, 26, 28, 30, 32, 34, 36, 38, as well as check field 40, form a response of the slave, which is read by the master.

FIG. 3 shows examples of time slots 42, 44, 46, 48, 50, 52, 54, 56, 58, 60, 62, 64, 66, 68, 70, 72, whose time intervals are a function of an amount of data, which are to be sent by slaves 74, 76, 78, 80, using data transmission frames. In this context, a first slave 74 is assigned a first time slot 42 for an amount of 1 byte of data, a second time slot 44 for an amount of 2 bytes of data, an xth time slot 46 for an amount of x bytes of data, or an eighth time slot 48 for an amount of 8 bytes of data. Correspondingly, a second slave 76 is assigned a first time slot 50 for an amount of 1 byte of data, a second time slot 52 for an amount of 2 bytes of data, an xth time slot 54 for an amount of x bytes of data, or an eighth time slot 56 for an amount of 8 bytes of data. In a schedule, a first time slot 58 for an amount of 1 byte of data, a second time slot 60 for an amount of 2 bytes of data, an xth time slot 62 for an amount of x bytes of data, or an eighth time slot 64 for an amount of 8 bytes of data are supplied by a master to an mth slave 78 of a total of k slaves 74, 76, 78, 80, so that this mth slave 78 is assigned one of the time slots 58, 60, 62, 64 shown here, which have time intervals of varying size, in order to provide data transmission, frames of varying size for receiving different amounts of data.

It is provided that the bus system have a total of k slaves 74, 76, 78, 80, where k=8. Using a schedule, the last, kth slave 80 is assigned, by the master, either a first time slot 66 for an amount of 1 byte of data, a second time slot 68 for an amount of 2 bytes of data, an xth time slot 70 for an amount of x bytes of data, or an eighth time slot 72 for an amount of 8 bytes of data.

A length of a time interval of a time slot 42, 44, 46, 48, 50, 52, 54, 56, 58, 60, 62, 64, 66, 68, 70, 72 is set by an amount of data, which a slave 74, 76, 78, 80 may insert into a data frame to be provided, after assignment of time slot 42, 44, 46, 48, 50, 52, 54, 56, 58, 60, 62, 64, 66, 68, 70, 72. The length of a time interval is set by the master as a function of the information regarding the amount of data to be sent, which slave 74, 76, 78, 80 has written to the information field of the interrogation frame assigned to it and, therefore, communicated to the master.

The diagram of FIG. 4 regarding a third specific example embodiment of the method according to the present invention includes an abscissa 82, along which a time in ms is plotted. In this context, the diagram of FIG. 4 includes a further example of an interrogation frame 84, which includes a header 85 that is transmitted to a master of a bus system during an interrogation 86 of slaves; as well as examples of data transmission frames 88, 90, 92 which are used in a data transmission cycle 94. In this case, data transmission cycle 94 immediately follows interrogation 86 and is also prepared and/or initiated by interrogation 86.

In the specific example embodiment described here, it is provided that the bus system have k=4 slaves. Consequently, interrogation frame 84 has a first information field 96 for a first slave, a second information field 98 for a second slave, a third information field 100 for a third slave, as well as a fourth information field 102 for a fourth slave. In this context, the above-mentioned information fields 96, 98, 100, 102 are empty when header 85 of interrogation frame 84 is transmitted by the master to the slaves. As soon as a slave receives header 85 during interrogation 86, this slave writes, to the information field 96, 98, 100, 102 assigned to it, information regarding data, which are to be sent by the respective slave to the master during the following data transmission cycle 94.

Specifically, in the example shown here, the first slave writes the information item "20:2" to the first information field 96 assigned to it. The second slave writes the information item "0:0" to the second information field 98 assigned to it, the third slave writes the information item "13:2" to the third information field 100 assigned to it. Furthermore, the fourth slave writes the information item "19:4" to the fourth information field 102 assigned to it.

Thus, the information item "Y:Z" is written by an mth slave to the mth information field 96, 98, 100 assigned to it, where Y stands for a first number and/or a first value, and Z stands for a second number and/or a second value. In this context, the first value Y includes information regarding an indication of the data to be sent, thus, in the example shown here, 20, 0, 13 or 19. In the present specific embodiment, the relevance or importance and/or urgency or age, which the data to be sent by the mth slave have, is specified by the indication. In this context, the smaller the value Y of the indication, the greater the relevance. Alternatively, or in addition, the time at which the data to be sent have been acquired by the mth slave is indicated by the value Y. In this case, the lower the value Y, the older the data to be sent. A size and/or amount of the data to be sent is indicated by the second value Z.

Consequently, using the data "20:2" in first information field 96, the first slave provides the information, that this first slave is to send an amount of 2 bytes of data, which have a relevance of 20 and/or were acquired at time Y=20. The third slave signals to the master, via the third information field 100 assigned to it, that it is to send an amount of 2 bytes of data, which have a relevance of 13 and/or were acquired at time Y=13. Using the data "19:4" in the fourth information field 102 assigned to it, the fourth slave informs the master that it is to send an amount of 4 bytes, which have a relevance of 19 and/or were acquired at time Y=19.

In the present specific embodiment, the data "0:0" in second information field 98, which is assigned to the second slave, assume a special status. In this case, the first information item having a Y value of 0 indicates that no data are to be sent by the second slave in the following data transmission cycle 94, the data automatically having an amount of 0 bytes.

During interrogation 86, after each slave has written the information "Y:Z" regarding the data to be sent, to the information field 96, 98, 100, 102 assigned to it, interrogation frame 84 is transmitted to the master and evaluated. In view of the information provided by the slaves, a time schedule having time slots for transmitting the data during the following data transmission cycle 94 is now assigned by the master, this time schedule being characterized by the sequence and size of the data transmission frames 88, 90, 92 transmitted by the master during data transmission cycle 94.

In this context, which slave is to send what amount of data, and what relevance and/or what age the data to be sent have, follows from the information in information fields 96, 98, 100, 102. In this case, the master is informed that the second slave does not have any data to send, and that the relevance of the data of the third slave (Y=13) is greater than the relevance of the data of the fourth slave (Y=19), and that this, in turn, is greater than the relevance of the data of the first slave (Y=20). In addition, the master is informed that the first and the third slave are each to send an amount of 2 bytes of data, and that the fourth slave is to send an amount of 4 bytes of data.

In view of this information, the master prepares the time schedule for the following data transmission cycle 94, the time schedule being characterized by the relevance and/or the age of the data to be sent, as well as by the amount of data to be sent by each slave. During data transmission cycle 94, at a first time 104 t1, the master now assigns the third slave a first-time slot for a first data transmission frame 88 having two data fields 106 for storing 2 bytes of data. At a second time 108 t2, the master assigns the fourth slave a time slot for a second data transmission frame 90 having four data fields 106 for storing 4 bytes of data. At a third time 110 t3, the master assigns the first slave a third time slot for the third data transmission frame 92 having two data fields 106 for storing 2 bytes of data.

In the present specific embodiment, it is provided that a transmission time $T_{Bit}$=52 μs be provided for each bit to be transmitted. In addition, a header 85, and therefore, a data header, of each of the frames shown, i.e., for interrogation frame 84 and data transmission frames 88, 90, 92, has a data length of $Bits_{Header}$=34. A data length of $Bits_{Trailer}$=10 is provided for a trailer of each of the frames represented in FIG.

4. Thus, the following formula (1) results for a transmission time $T_{F0}$ of interrogation frame 84:

$$T_{F0}=1.4*(T_{Bit}*(\text{Bits}_{Header}+(N_{Slaves}*10)+\text{Bits}_{Trailer})) \quad (1)$$

The data transmission duration for interrogation frame 84 is represented by first double arrow 108 in the diagram of FIG. 4. The transmission time of data transmission frames 88, 90, 92 is represented by the following formula (2), where m stands for the number of slaves and Z stands for the number of bytes to be transmitted.

$$T_{FmZ}=1.4*(T_{Bit}*(\text{Bits}_{Header}+(Z*10)+\text{Bits}_{Trailer})) \quad (2)$$

In this context, in the diagram of FIG. 4, data transmission time $T_{F32}$ of first data transmission frame 88 for the third slave is illustrated by second double arrow 110 as representative of all of the data transmission times $T_{FmZ}$ provided. In the specific embodiment described, it is provided, e.g., that up to 6 bytes of data be able to be transmitted per data transmission cycle 94 and per slave.

Therefore, in the bus system, a maximum of six data fields 106 per data transmission frame 88, 90, 92 are provided for receiving payload data (payload). Accordingly, a data transmission frame 88, 90, 92, which is configured to transport an amount of 6 bytes of data, has a data transmission time $T_{Fm6}$=7.58 ms. Thus, a data transmission cycle 94 lasts 4*7.58 ms=30.32 ms. A data transmission time $T_{F0}$=6.13 ms results for interrogation frame 84. A data transmission time $T_{F32}$=4.67 ms results for first data transmission frame 88, by which 2 bytes of data are to be transmitted, a data transmission time $T_{F44}$=6.13 ms results for second data transmission frame 90, by which 4 bytes of data are transmitted, and a data transmission time $T_{F12}$=4.67 ms results for third data transmission frame 92, by which 2 bytes of data are also transmitted, which means that a cycle time for interrogation cycle 86 and data transmission cycle 94 is obtained from the sum of the data transmission times and amounts to 21.60 ms.

Figure 5:
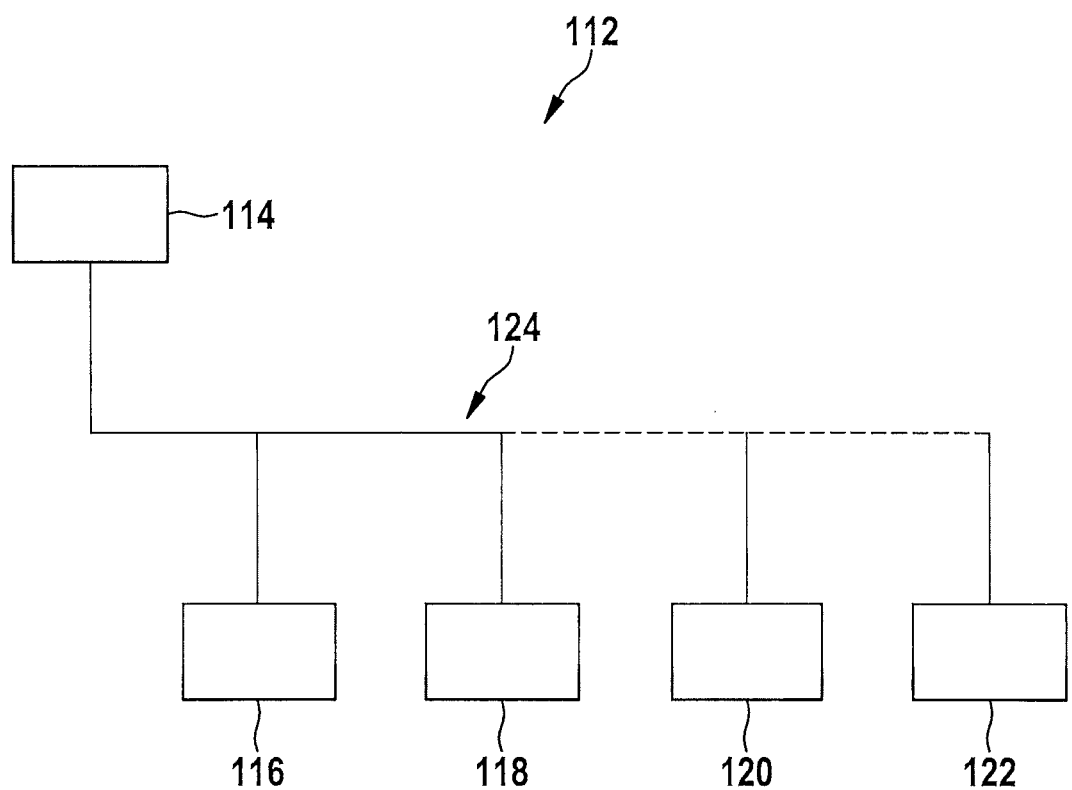
FIG. 5 shows a schematic representation of a specific example embodiment of a bus system according to the present invention.

The specific example embodiment of the bus system 112 of the present invention, which is schematically represented by FIG. 5, is configured as a LIN (local interconnect network) network and includes a master 114, which, in this case, takes the form of a control unit of a motor vehicle. In addition, the bus system 112 includes a first slave 116, a second slave 118, an mth slave 120, as well as a last, kth slave 122. In this context, slaves 116, 118, 120, 122 may take the form of sensors or actuators of the motor vehicle. In addition, all of the users of bus system 112, that is, master 114, as well as slaves 116, 118, 120, 122, are serially connected along a communications link 124, and are therefore connected in series.

Master 114 is configured to transmit a header of an interrogation frame, which includes k empty information fields, to slaves 116, 118, 120, 122. In each instance, an mth slave 116, 118, 120, 122 is assigned an mth information field of the k information fields. After reception of the header of the interrogation frame by mth slave 116, 118, 120, 122, it writes an information item to the mth information field assigned to it, regarding the amount of data which is to be sent by mth slave 116, 118, 120, 122 to master 114 in a subsequent data transmission cycle. After filling the initially empty information fields, slaves 116, 118, 120, 122 transmit the interrogation frame filled in with information to master 114 again. After receiving the filled-in interrogation frame, master 114 prepares a time schedule for transmitting the data; the time schedule taking into account the amount of data to be sent.

Furthermore, it is provided that mth slave 116, 118, 120, 122 additionally write an information item regarding an indication of the data to be sent, to the mth information field assigned to it. These information items regarding the indication of the data are also taken into account by master 114 for preparing the time schedule.

Since mth slave 116, 118, 120, 122 writes information regarding the amount and/or the indication of the data to be sent, to the mth information field, it communicates to master 114 whether or not data are to be sent by it.

The data to be sent during the data transmission cycle are transmitted in view of the time schedule. The time schedule is implemented, using a sequence of time slots that are assigned to slaves 116, 118, 120, 122 by master 114.

Preparing the time schedule allows each slave 116, 118, 120, 122, by which data are to be transmitted, to be sent a time slot designated for it, the mth slave 116, 118, 120, 122 being assigned an mth time slot. A slave 116, 118, 120, 122, which has announced that no data are to be sent by it, by writing at least one of the information items to the information field assigned to it, i.e., via the information regarding the amount and/or the indication of the data, is not assigned a time slot by master 114 during the data transmission cycle.

Using the time schedule, a sequence is established as to when the data to be sent are transmitted by which slave. This sequence is a function of, inter alia, the indication of the data to be sent. By writing the information regarding the indication to the information field of the interrogation frame assigned to it, slave 116, 118, 120, 122 communicates to master 114 the relevance, importance, urgency and/or priority, which the data to be sent by it have. After receiving the interrogation frame, master 114 compares the information specified by all of the slaves 116, 118, 120, 122. The information regarding the indication is quantitatively set by values for this; the higher the value of the indication specified by slave 116, 118, 120, 122 as an information item, the earlier the data of a slave 116, 118, 120, 122 are to be processed. In order to implement the schedule, a first time slot is assigned to the slave 116, 118, 120, 122, whose data to be sent have the highest value of the indication. An nth slave 116, 118, 120, 122, whose to-be-transmitted data regarding the indication assume an nth rank in a ranking of all of the values of the indication, is assigned an nth time slot. In the sequence, a last time slot is assigned to the slave 116, 118, 120, 122, whose data to be transmitted have a lowest value of the indication. Slaves 116, 118, 120, 122 supply data transmission frames according to the sequence, fill them with the data to be sent, and send the data transmission frames to master 114, which receives the data transmission frames according to the sequence and processes the data stored in them according to the sequence.

The mth data transmission frame has at least one data field, which includes a storage space that is adapted to the amount of data to be sent by mth slave 116, 118, 120, 122; after receiving the mth data transmission frame, mth slave 116, 118, 120, 122 inserting the data to be sent into the at least one data field and transmitting the mth data transmission frame filled with data to master 114.

What is claimed is:

1. A method for operating a bus system which includes a master and k slaves as users, the method comprising:
   transmitting by the master to the slaves a header of an interrogation frame which includes k information fields, in each instance, an mth slave being assigned an mth information field;
   writing by the mth slave to the mth information field assigned to it an information item regarding an amount of data which is to be sent by the mth slave to the master;
   transmitting the interrogation frame to the master; and preparing by the master a time schedule for transmitting the data, by which the amount of data to be sent is taken into account.

2. The method as recited in claim 1, wherein an information item regarding an indication of the data to be sent is written by the mth slave to the mth information field assigned to it.

3. The method as recited in claim 1, wherein by writing at least one information item to the mth information field, the mth slave communicates whether or not data are to be sent by it.

4. The method as recited in claim 1, wherein the header is transmitted by the master to the slaves for initiating a data transmission cycle, and the data to be sent are transmitted during the data transmission cycle in view of the time schedule.

5. The method as recited in claim 1, wherein via the provision of the time schedule, each slave, by which data are to be transmitted, is assigned at least one time slot; the mth slave being assigned an mth time slot.

6. The method as recited in claim 1, wherein using the time schedule, a sequence is set as to when the data to be sent are transmitted by which slave.

7. The method as recited in claim 5, wherein the mth time slot is adapted to the amount of data to be sent by the mth slave; wherein after assignment of the mth time slot assigned to it, the mth slave inserts the data to be sent, into at least one data field of an mth data transmission frame; and wherein the mth slave transmits the mth data transmission frame assigned to it to the master.

8. The method as recited in claim 5, wherein the slaves are assigned a plurality of time slots by the master in view of the time schedule.

9. A bus system, comprising:
a master; and
k slaves as users;
wherein the master is configured to transmit a header of an interrogation frame, which includes k information fields, to the slaves, an mth slave being assigned an mth information field; and wherein in each instance, the mth slave is configured to write an information item, which is in regard to an amount of data that is to be sent by the mth slave to the master, to the mth information field assigned to the mth slave; and wherein the slaves are configured to transmit the interrogation frame to the master; and wherein the master is configured to prepare a time schedule, which takes into account the amount of data to be sent to transmit the data.

10. The bus system as recited in claim 9, wherein the bus system is configured as a LIN (local interconnect network) network.

11. A method for operating a bus system which includes a master and k slaves as users, the method comprising:
transmitting by the master to the slaves a frame that includes k information fields, each of the k information fields being assigned to a different respective one of the k slaves;
subsequent to the transmission, the k slaves modifying the frame by, for each of the k fields, writing, by the respective slave to which the respect field is assigned, information that indicates an amount of data that the respective slave is to send;
subsequent to the modification, receiving, by the master, the modified frame that includes in each of the k fields the respective information written to the respective field by the respectively assigned slave; and
using the received modified frame, preparing, by the master, a time schedule for transmitting the data, wherein the preparing is based on the respective amounts of data indicated in the respective fields of the modified frame.

* * * * *